(12) United States Patent
Gabriel et al.

(10) Patent No.: US 9,197,560 B2
(45) Date of Patent: *Nov. 24, 2015

(54) ASSIGNING IDENTIFIERS TO MOBILE DEVICES ACCORDING TO THEIR DATA SERVICE REQUIREMENTS

(71) Applicant: Lenovo Enterprise Solutions (Singapore) Pte. Ltd., Singapore (SG)

(72) Inventors: Cynthia Ann Gabriel, Gilroy, CA (US); Bill Shao, Pleasanton, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 31 days.

This patent is subject to a terminal disclaimer.

(21) Appl. No.: 14/074,400

(22) Filed: Nov. 7, 2013

(65) Prior Publication Data
US 2014/0064087 A1     Mar. 6, 2014

Related U.S. Application Data

(63) Continuation of application No. 13/570,739, filed on Aug. 9, 2012, now Pat. No. 8,958,294.

(51) Int. Cl.
*H04L 1/00* (2006.01)
*H04L 12/801* (2013.01)
*H04L 12/911* (2013.01)
(Continued)

(52) U.S. Cl.
CPC ............ *H04L 47/12* (2013.01); *H04L 41/5022* (2013.01); *H04L 47/824* (2013.01); *H04L 61/2007* (2013.01)

(58) Field of Classification Search
CPC ......... H04L 47/10; H04L 47/30; H04L 47/11; H04L 47/12; H04L 47/15; H04L 47/2441; H04L 47/70; H04L 47/35; H04L 47/32
USPC ......... 370/389, 392, 397, 395.3, 395.31, 409, 370/410, 428, 229, 230, 231, 235; 709/229, 709/232
See application file for complete search history.

(56) References Cited

U.S. PATENT DOCUMENTS

| | | |
|---|---|---|
| 7,765,312 B2 | 7/2010 | Monette et al. |
| 7,934,015 B2 | 4/2011 | Dunk |
| 2008/0317053 A1 | 12/2008 | Panda et al. |

(Continued)

OTHER PUBLICATIONS

"Accessing Network Service from a Mobile Device via Protocol Shadowing", IP.COM No. IPCOM00131873D, Nov. 21, 2005; 3 pages.

(Continued)

*Primary Examiner* — Dady Chery
(74) *Attorney, Agent, or Firm* — Law Office of Jim Boice

(57) ABSTRACT

A network fabric includes a mobile device associated with a service type and a server including a processor and memory storing program code for assigning identifiers to mobile devices in accordance with an identifier assignment policy. The processor, in response to executing the program code stored in the memory, associates a service type with the mobile device, maps the service type to an identifier predetermined to cause frames bearing the identifier to receive a particular frame-forwarding treatment within the network fabric, assigns the identifier to the mobile device based on the service type of the mobile device, and sends the identifier to the mobile device for inclusion in frames transmitted by the mobile device.

9 Claims, 3 Drawing Sheets

(51) Int. Cl.
*H04L 12/24* (2006.01)
*H04L 29/12* (2006.01)

(56) References Cited

U.S. PATENT DOCUMENTS

| | | | |
|---|---|---|---|
| 2009/0296646 A1* | 12/2009 | Dunk | 370/329 |
| 2011/0026527 A1 | 2/2011 | Shao et al. | |
| 2011/0085439 A1 | 4/2011 | Chandrachood et al. | |
| 2012/0100841 A1* | 4/2012 | Manuel et al. | 455/418 |
| 2012/0117228 A1 | 5/2012 | Gabriel et al. | |

OTHER PUBLICATIONS

Korhonen, J. et al, "Service Selection for Mobile IPv4 (RFC5446)", IP.COM No. IPCOM000179240D, Feb. 1, 2009; 11 pages.
"Identifying a Social Network User Identifier Based on a User Message", IP.COM No. IPCOM000198126D, Jul. 26, 2010; 31 pages.
Non-Final Office Action in related U.S. Appl. No. 13/570,739, mailed on Mar. 20, 2014; 13 pages.
Final Office Action in related U.S. Appl. No. 13/570,739, mailed on Jul. 31, 2014; 13 pages.
Notice of Allowance in related U.S. Appl. No. 13/570,739, mailed on Oct. 15, 2014; 8 pages.

* cited by examiner

ASSIGNING IDENTIFIERS TO MOBILE DEVICES ACCORDING TO THEIR DATA SERVICE REQUIREMENTS

RELATED APPLICATION

This application is a continuation application of U.S. patent application, Ser. No. 13/570,739, filed on Aug. 9, 2012, entitled "Assigning Identifiers to Mobile Devices According to their Data Service Requirements", the contents of which are incorporated by reference herein in their entirety.

FIELD OF THE INVENTION

The invention relates generally to network fabrics and frame processing. More particularly, the invention relates to a method for distributing identifiers to mobile devices to ensure prescribed frame-forwarding behavior.

BACKGROUND

Currently, the assignment of Internet Protocol (IP) addresses and other device identification attributes to mobile devices do not take into account the network resources required for their interaction with the Internet "cloud" services. For example, a DHCP (Dynamic Host Configuration Protocol) server assigns IP addresses to mobile devices without regard to the capabilities of the network switches and routers deployed on the network and their ability to service the requirements of the mobile devices. This undirected assignment can lead to poor user experience because of suboptimal network performance. Problems include dropped connections, high latency, uneven bandwidth allocation, and others. Current solutions to the problem (e.g., using Quality of Service (QoS) levels) can still produce poor results because mobile applications and hardware implementations typically do not use QoS settings consistently. Therefore, the additional computing resources required for processing QoS settings encoded into data packets do not regularly produce desired results.

SUMMARY

In one aspect, the invention features a method for processing frames from mobile devices. The method comprises associating a service type with a mobile device. The service type is mapped to an identifier predetermined to cause frames containing the identifier to receive a particular frame-forwarding treatment within a network fabric. The identifier is assigned to the mobile device based on the service type with which the mobile device is associated, and sent to the mobile device for inclusion in frames transmitted by the mobile device.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
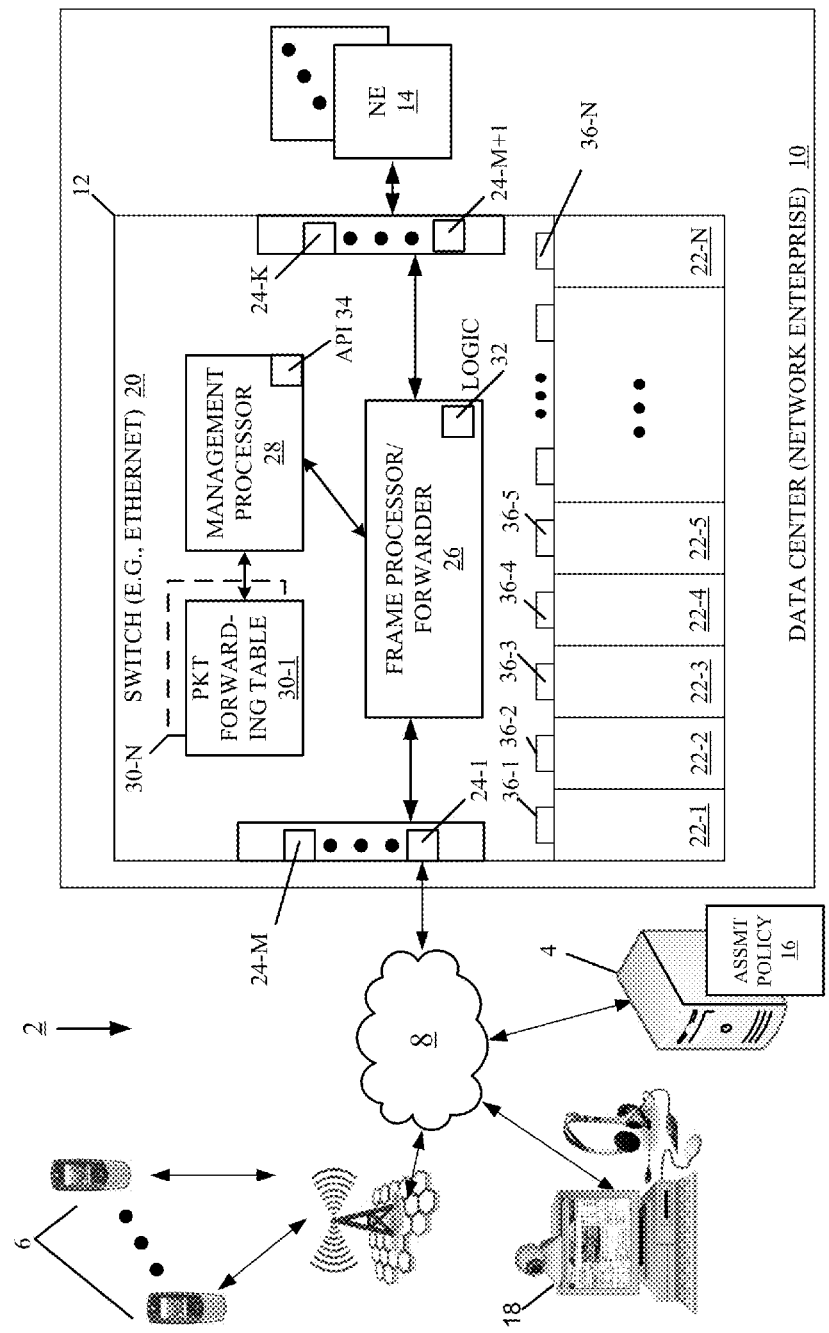
FIG. 1 is an embodiment of a network environment including a data center or network enterprise with a gateway network element.

Systems and methods described herein assign identifiers (e.g., IP addresses) to mobile devices for the mobile devices to include in their transmitted frames (also packets, protocol data units or PDUs). This assignment of IP addresses and/or other device identifiers to mobile devices occurs according to dynamic policies linked to traffic-management algorithms deployed by the network elements (e.g., switches, routers) of the network fabric. The customized assignment of identifiers to mobile devices optimizes the network elements handling the data traffic from these mobile devices. The resulting identifier assignments ensure a fit between actual IP addresses, for example, and algorithms used by the network elements to provide the particular support (i.e., resource allocation) necessary to satisfy the service requirements of the mobile devices.

In brief overview, network elements deployed at the gateway of a data center implement a traffic-management algorithm (i.e., policy) designed to provide certain levels of services and to optimize the allocation of resources (e.g., load balancing). One example implementation of a traffic-management policy maps incoming packets to "buckets" based on header information, specifically certain network identifiers or attributes, in the headers of the packets. Each "bucket" is an abstraction used to identify a location, examples of which include, but are not limited to, resources, memory, chassis slots, physical ports, virtual ports, groups of ports, trunks, MAC/IP addresses, and virtual MAC/IP addresses. This mapping of packets to buckets is referred to herein as a bucket distribution. In general, the bucket distribution of a gateway network element is configured to optimize resources of the network fabric served by the gateway network element. For example, a particular bucket distribution can be configured to load balance data traffic across network switches/routers deployed on the network fabric or across a set of servers.

The values of certain identifiers within the incoming packets determine the buckets to which the incoming packets map, and thus the manner by which the gateway network element forwards the packets. For example, a network element can use the source and/or destination IP addresses within an incoming data packet to identify a bucket and then use the identified bucket to direct the packet to a specific port or port group associated with data processing or routing applications.

When the distribution of IP addresses (or device identifiers) within the incoming packets does not match the objectives of the bucket distribution, as is typical with undirected IP address assignment, the network and computing resources of the network fabric are used sub-optimally. To avoid sub-optimal performance, the bucket distribution is tailored to support mobile service types, and the IP addresses are distributed among mobile devices to conform to the bucket distribution, and thus the desired service levels and resources.

A server associated with the gateway network element uses the bucket distribution to create an identifier assignment policy to be uploaded to and updated on at least one identifier assignment server. The identifier assignment server assigns IP addresses (or device identifiers) to mobile devices accordingly. As the result of this assignment, traffic originating from the mobile devices is forwarded to satisfy service level requirements and optimize the use of network resources. Advantageously, the controlled assignment of IP addresses (or device identifiers) to mobile devices can improve the user experience because the mobile devices are receiving tailored service support. Furthermore, the resource allocation within the network fabric and within data centers serving mobile devices is more efficient than undirected IP assignment.

FIG. 1 shows an embodiment of a networking environment 2 including a server 4, a plurality of mobile devices 6, a data center 10, a management station 18, coupled to a network 8. Embodiments of the network 8 include, but are not limited to, local-area networks (LAN), metro-area networks (MAN), and wide-area networks (WAN), such as the Internet or World Wide Web. In general, the server 4 is a computer (or group of computers) that provides one or more services to the data center 10, examples of which include, but are not limited to, email servers, proxy servers, DNS servers. In one embodiment, the server 4 provides an identifier assignment service used by a service provider to assign identifiers to the mobile devices 6 in accordance with service requirements, as described in more detail below. This identifier assignment server 4 has an identifier assignment policy 16 that governs the identifier assignments. Although shown external to the data center 10, in one embodiment, the identifier assignment server 4 may be part of the data center 10.

In general, each mobile device 6 is associated with a different service type and runs one or more applications that require the services of the data center 10. Examples of mobile devices include, but are not limited to, mobile phones, smartphones, portable media devices, digital still cameras, digital video cameras, tablets, handheld devices, handheld game consoles, mobile Internet devices, mobile Web devices, personal digital assistants (PDAs), personal navigation devices, portable media players, and laptop computers. Examples of service types include, but are not limited to, voice, data (e.g., texting, browsing, applications, application sharing), video, and any combination thereof. Types of service can include other features, often defined in service level agreements (SLAs), for example, service guarantees, priority levels, and security requirements.

The data center 10 is generally a facility that houses various computers, routers, switches, and other associated equipment in support of applications and data that are integral to the operation of a business, organization, or other entities. Example embodiments of the data center 10 include a Layer 2 (L2) VLAN and an Ethernet LAN. The data center 10 includes a gateway network element 12 in communication with other network elements 14 to provide a network fabric, which provides switching and server services for packet traffic from the mobile devices 6. Embodiments of such network elements include, but are not limited to, core switches, access switches, fabric cards, line cards, and management modules in a physical chassis switch. The number of network elements 14 in the network fabric can range in the hundreds or thousands. The data center 10 can have more than the one gateway network element 12 shown. In addition, embodiments of the data center 10 may be at a single site or distributed among multiple sites.

The gateway network element 12 is an independent (standalone) electronic enclosure or chassis, and comprises a switch 20 and server blades (or simply servers) 22-1, 22-2, . . . , 22-N (generally, 22) in communication with the switch 20. In general, each server blade 22 is a computer that provides one or more services to the data center 10, examples of which include, but are not limited to, email servers, proxy servers, DNS (Domain Name System) servers, HTTP (HyperText Transport Protocol) servers, firewall servers, video compression servers, and deduplication servers. The switch 20 includes externally facing ports 24-1, . . . , 24-K (generally, 24) in communication with external systems (i.e., client systems, other network elements, networking equipment), and server-facing ports 36-1, 36-2, . . . , 36-N (generally, 36) in communication with the servers 22. In one embodiment, the switch 20 is an Ethernet switch and the ports 24, 36 of the switch 20 can support 10 GB line rates.

In addition, the switch 20 includes a frame processor/forwarder (FP) 26, a management processor (MP) or CPU 28, and one or more packet-forwarding tables 30-1, 30-2, . . . , 30-N (generally, 30). Implementations of the individual components of the switch 20, such as the frame processor/forwarder 26 and the management processor 28, or the entire switch 20, may be implemented as hardware, software, or a combination of hardware and software using, for example, ASIC (Application Specific Integrated Circuit) technology on one or more semiconductor chips, application specific standard products (ASSP), or field-programmable gate array (FPGA) semiconductor devices.

Each packet-forwarding table 30 contains entries that determine the packet-forwarding behavior of packet traffic arriving at the switch 20 through one of its ports 24, 36. Each entry of each packet-forwarding table 30 maps a unique value to one of the ports 24, 36 of the switch 20. The table entries of the packet-forwarding table 30-1, for example, affect the distribution of the incoming packet traffic across the servers 22 in accordance with a traffic-management policy (i.e., bucket distribution). In one embodiment, the entries of the packet-forwarding table 30-1 are configured such that incoming packet traffic arriving at the switch 20 through one of its externally facing ports 24 is load balanced across the servers 22 through one of the server-facing ports 36. Example implementations of the packet-forwarding table 30-1 include, but are not limited to, an L2 forwarding table, an L3 routing table, a link aggregation (i.e. static or LACP trunk) table, an Equal Cost Multi Path (ECMP) table, and a frame/field processor (i.e. access control list) table.

Another packet-forwarding table 30-2 may be employed for particular traffic-management applications, for example, traffic prioritization, Service Level Agreement (SLA) enforcement, selective remote data backup, and cached data retrieval. Like those of the packet-forwarding table 30-1, each entry of the packet-forwarding table 30-2 can map a value to a server port 36 or to any other port, such as an externally facing port 24 or an inter-switch link 30. Embodiments of switches that have such table(s) 30-2 can use them in conjunction with or instead of the packet-forwarding table 30-1. Alternatively, the packet-forwarding table 30-2 can be implemented as special-purpose entries within the packet-forwarding table 30-1, instead of as a separate table.

In general, the packet-forwarding table 30-2 establishes the distribution of the packet traffic (arriving from the servers 22 through one of the server-facing ports 36) across the externally facing ports 24 (and, thus, across the other network elements 14) in accordance with a traffic-management policy (i.e., bucket distribution). In one embodiment, the entries of the packet-forwarding table 30-2 are configured such that the outgoing packet traffic arriving at the switch 20 through one of its server-facing ports 36 is inspected to selectively choose a specific externally facing port 24 to egress out to the network elements 14. In another embodiment, the packet-forwarding table 30-2 may not be configured at all, in which case, outgoing packet traffic arriving at the switch 20 through one of its server-facing ports 36 is forwarded out to the network elements 14 connected to its externally facing ports 24 using standard L2 forwarding or L3 routing policies.

The frame processor/forwarder 26 includes logic 32 for forwarding packets bidirectionally between the ports (e.g., externally facing ports 24 and server-facing ports 36), using the packet-forwarding tables 30. The logic 32 may be implemented as hardware, software, or a combination of hardware and software. In general, the logic 32 examines specific content in the header of an incoming packet (or frame or protocol data unit), generates a value based on the header content, uses the generated value as an index into the packet-forwarding tables 30 to identify a destination port, and redirects that packet to the destination port of the switch 20. The specific header content examined by the logic 32 can be based on a user-specified function or algorithm and is part of the traffic-management policy used by the switch 20 to distribute packet traffic.

For example, the header content can come from any one or combination of fields in the header, examples of such fields include, but are not limited to, source and destination MAC addresses, source and destination IP (Internet Protocol) addresses, source and destination virtual MAC addresses, source and destination virtual IP addresses, a UDP (User Datagram Protocol) port, a TCP (Transmission Control Protocol) port, a VLAN (Virtual Local Area Network) identifier, and a VLAN tag. The particular fields used are selectable by an administrator of the switch 20. From the select field(s), the logic 32 produces a value that serves or hash as an index into the packet forwarding table(s) 30. As an example, the logic 32 can apply a bit mask to a select field, such as the destination IP address, and use the resulting value as the index. For example, a mask that masks out all but the three least significant bits of the selected field produces a 3-bit value, which can map to eight different packet-forwarding table entries. This index points to one of the table entries of the packet-forwarding table(s) 30, and identifies a port (24 or 36).

In addition, the logic 32 of the switch 20 can monitor the traffic distribution pattern (e.g., a one-second moving window of the number of packets forwarded to each of the server-facing ports), record that traffic pattern in memory, and transmit the recording to one or more of the servers 22 or to an external management agent (e.g., 18). Alternatively, the external management agent 18 can request the state of the packet-forwarding table(s) 30 from the switch 20 in addition to the packet-to-server distribution statistics in order to facilitate the monitoring of the traffic distribution pattern.

The management processor 28 dynamically adds, removes, or modifies entries in the packet-forwarding table(s) 30 used by the frame processor/forwarder 26. The switch 20 also includes an application program interface (API) 34 through which the packet-forwarding behavior of the switch 20 can be programmed and reconfigured, statically or dynamically. Here, for example, the management processor 28 has the API 34. The API 34 enables other entities to communicate with the switch 20 (e.g., using SNMP) to change one or more entries of the packet-forwarding table 30-1 and/or the special-purpose table 30-2, the function or algorithm by which index values are generated from incoming packets, or a combination thereof. For example, the server 4 (FIG. 1), any of the server blades 22, or other network elements 14 can use the API 34 to cause the switch 20 to update entries in the packet-forwarding table(s) 30. In addition, the switch 20 itself can change its own traffic distribution pattern by changing its own table entries and/or the function used to derive an index value into the packet-forwarding table(s) 30. Example implementations of traffic-management policies are described in U.S. application Ser. No. 12/902,703, filed Oct. 12, 2010, and titled, "Tag-based Interface between a Switching Device and Servers for use in Frame Processing and Forwarding", and in U.S. application Ser. No. 13/291,432, filed Nov. 8, 2011, and titled, "Dynamic Traffic Management in a Data Center," the entireties of which applications are incorporated by reference herein.

The management station 18 provides a centralized point of administration for managing the data center 10. The management station 18 can connect directly (point-to-point) or indirectly to the server 4 (or to the network element 12 of the data center 10) over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet or SNMP (Simple Network Management Protocol), the management station 18 can access a command-line interface (CLI) of the server 4 or network element 12. Through a management agent program running on the management station 18, an administrator of the data center 10 can generate an assignment policy 16 based on a bucket distribution deployed at the network element 12. The management station 18 uploads the identifier assignment policy 16 to the identifier assignment server 4, and can share the identifier assignment policy 16 with the network element 12.

Figure 2:
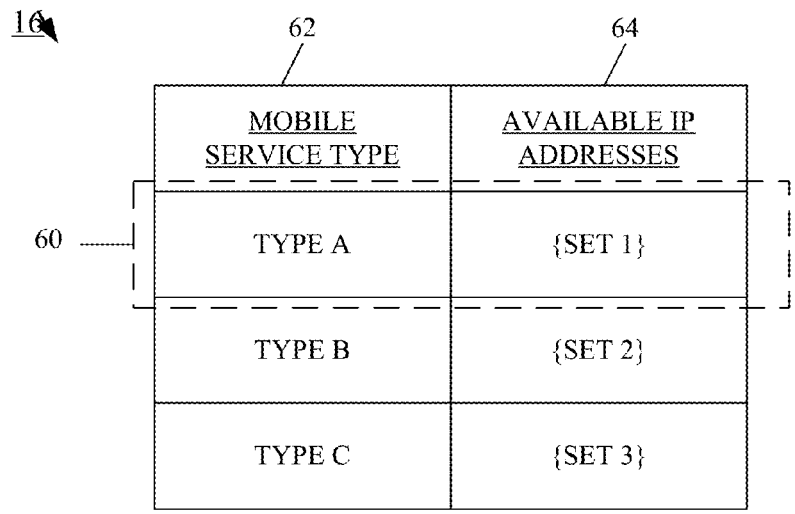
FIG. 2 is a table form of an embodiment of an identifier assignment policy by which, for example, Internet Protocol (IP) addresses are assigned to mobile devices based on their service types.

FIG. 2 shows an embodiment of an assignment policy 16 implemented as a table with entries 60. Each entry 60 maps a mobile service type 62 to a range (or set) of available IP addresses 64. Although described in connection with IP addresses 64, the table entries 60 can map mobile service types 62 to any other identifiers, provided the assigned identifiers are those used to implement the bucket distribution deployed at the network element 12. The available IP addresses 64 assigned to service type A, for example, are chosen such that the algorithm used by the logic 32 to compute a hash value from these IP addresses 64 will invariably produce an index to one or more predefined entries of the packet-forwarding table(s) 30, and, thereby, to specific ports (24 or 36). These specific ports (24 or 36) couple the gateway network element 12 to servers 22 or other network elements 14 designed to provide the particular service(s) required by service type A.

Figure 3:
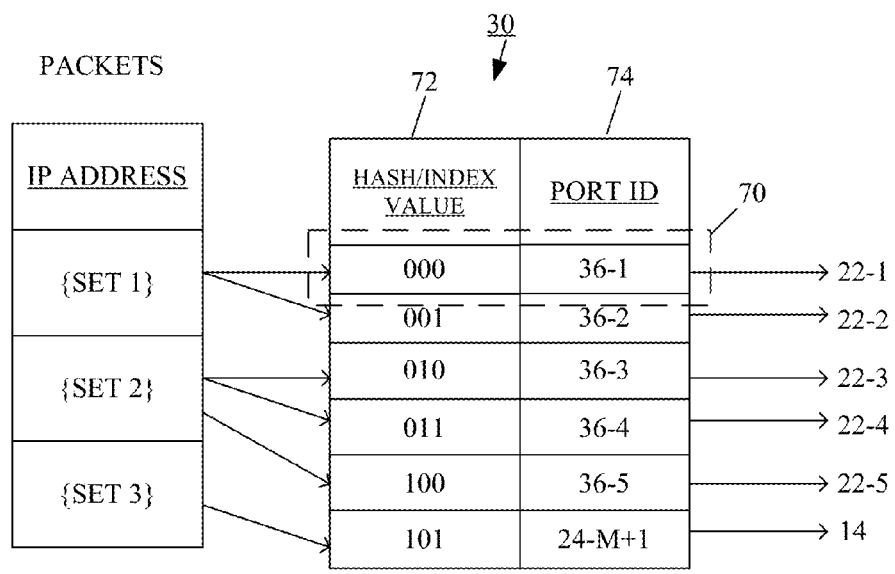
FIG. 3 is an example of a bucket distribution used in combination with an identifier policy to determine packet-forwarding behavior for traffic received from the mobile devices.

FIG. 3 shows an example of a bucket distribution (embodied in the packet-forwarding table(s) 30) that cooperates with an identifier assignment policy 16 to produce a packet-forwarding behavior tailored to the service types 62 of mobile phones. Each entry 70 of the packet-forwarding table(s) 30 includes a hash/index value 72 and a port ID 74. Packets from mobile devices 6 include a source IP address, for example, assigned to the mobile devices 6 in accordance with the identifier assignment policy 16. The logic 32 operating on the switch 20 produces a hash/index value 72 from these IP addresses in accordance with a predefined algorithm or function. In this example, IP addresses within the range of {set 1} resolve to a hash/index value 72 of either 000 or 001. Packets bearing IP addresses in the range of {set 1} thus are forwarded to port 36-1 or port 36-2. In this simplified example, mobile devices of a particular service type (Type A; FIG. 2) may be "load balanced" across these two ports 36-1, 36-2 to their respective servers 22-1, 22-2. Furthermore, such servers 22-1, 22-2 may be particularly configured to service the requirements of the mobile device of service Type A.

Similarly, IP addresses within the range of {set 2} resolve to hash/index values 72 of 010, 011, and 100, and packets bearing such IP addresses are thus forwarded to ports 36-3, 36-4, or 36-5. Accordingly, packets from mobile devices of a particular service type (Type B; FIG. 2) are distributed across these three ports 36-3, 36-4, 36-5 to their respective three servers 22-3, 22-4, 22-5, which may be particularly configured to service the requirements of the mobile device of service Type B. As another example, IP addresses within the range of {set 3} resolve to the hash/index value 72 of 101, which causes the switch 20 to forward packets bearing such IP addresses to an externally facing port (e.g., 24-M+1) coupled to a network element 14.

Figure 4:
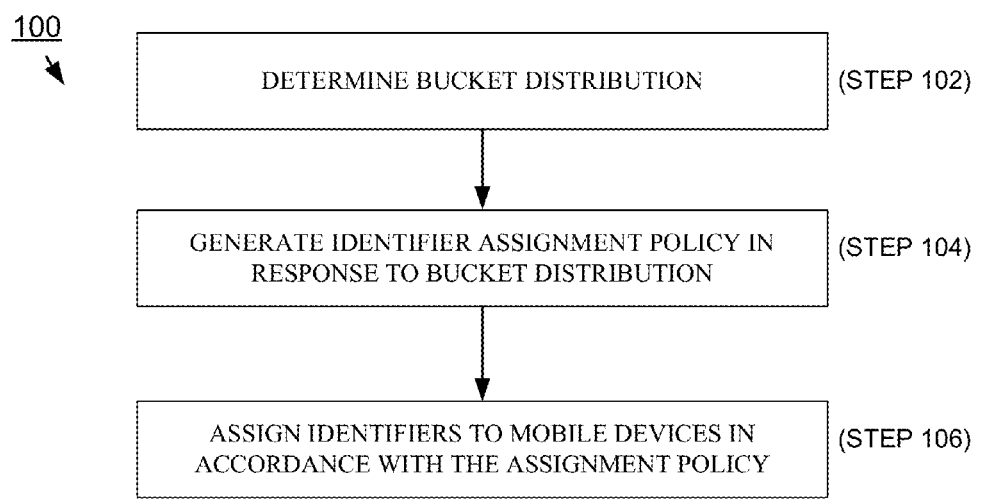
FIG. 4 is a flow diagram of an embodiment of a process by which network identifiers are assigned to mobile devices to ensure an allocation of resources that specifically supports the service requirements of the mobile devices.

FIG. 4 shows an embodiment of a process 100 for assigning an identifier to a mobile device 6, generally in response to a request from the mobile device for an address. In the description of the process 100, reference is made to elements found in the other figures. The process 100 includes determining, at step 102, a flow-control "bucket" distribution based on the service type. The bucket distribution determines the mapping of hash/index values 72 to ports 74 (and may be embodied in a packet-forwarding table 30). The network element 12 (i.e., flow-control switch/router), server 4, or another entity (derived from the information provided by the switch/router) can determine the bucket distribution.

The process 100 further includes generating, at step 104, an identifier (e.g., IP address) assignment policy 16. In one embodiment, the assignment policy 16 is implemented as a set of service types 62 (e.g. implemented in a list or table), with each service type 62 being associated with one or more identifiers. The distribution of identifiers can be designed to ensure that the packets of mobile devices 6 fall into certain buckets to cause such packets to get the required services. Examples of the identifiers include, but are not limited to, lists of IP addresses, ranges of IP addresses, tables, and algorithms. For example, generating an identifier can include selecting an IP address from a list of available IP addresses 64 and matching the selected IP address by a hash value 72 to the desired type of service 62.

In general, the service provider generates the identifier assignment policy 16 (working through a management station, such as management station 18). After the generation of the identifier assignment policy 16, the identifier assignment server 4 assigns (step 106) IP addresses and/or other network ID attributes to a mobile device 6 according to the assignment policy 16, depending on the type of service 62 the mobile device 6 requested. Although described with respect to mobile devices 6, the principles set forth herein can extend to the assignment of identifiers to other types of devices that request an identifier (e.g., an IP address), for example, upon turning on or booting up.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for processing frames from mobile devices, the method comprising:
    associating a service type with a mobile device, wherein each of the mobile devices is associated with a different service type;
    mapping the service type to an identifier predetermined to cause frames containing the identifier to receive a particular frame-forwarding treatment within a network fabric;
    assigning the identifier to the mobile device based on the service type with which the mobile device is associated; and
    sending the identifier to the mobile device for inclusion in frames transmitted by the mobile device;
    applying a bit mask to a predetermined field in a header in the frames to create a hash index value;
    assigning the hash index value to a port that is attached to a particular server in a data center; and
    forwarding the frames to the port in the data center to which the hash index value has been assigned.

2. The method of claim 1, further comprising configuring a network element to forward frames received from the mobile device and containing the assigned identifier to a certain port of the network element by which the frames obtain a service associated with the service type.

3. The method of claim 1, wherein the assigned identifier is an IP (Internet Protocol) address.

4. The method of claim 1, further comprising generating an identifier (ID) assignment policy that maps service types of mobile devices to sets of identifiers.

5. The method of claim 1, further comprising:
    determining, by the network element, a value from the identifier; and
    mapping, by the network element, the value to a port of the network element.

6. The method of claim 5, further comprising forwarding, by the network element, the incoming frames containing the assigned identifier to a server through the port.

7. The method of claim 5, further comprising forwarding, by the network element, the incoming frames containing the assigned identifier to another network element through the port.

8. The method of claim 1, further comprising:
- associating a set of identifiers with the service type;
- assigning each identifier of the set of identifiers with a different mobile device associated with the service type; and
- configuring the network element to map the identifiers in the set of identifiers to a plurality of ports of the network element to achieve a traffic distribution pattern across the plurality of ports that conforms to a traffic-management policy implemented by the network fabric for data traffic from the different mobile devices associated with the service type.

9. The method of claim 1, further comprising:
- mapping the frames to a bucket based on header information in the frames, wherein the bucket is an abstraction used to identify a location of one or more of resources, memory, chassis slots, physical ports, virtual ports, groups of ports, trunks, MAC/IP addresses, and virtual MAC/IP addresses used by the frames; and
- forwarding the frames according to information found in the bucket.

* * * * *